May 24, 1966  M. W. WATTS  3,252,681
FASTENING DEVICE
Filed April 26, 1963
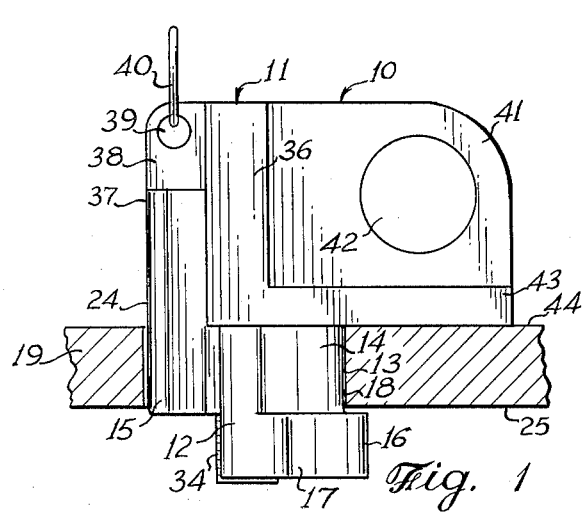
Fig. 1
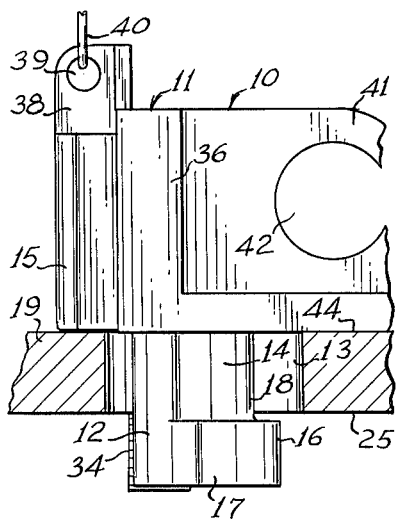
Fig. 2
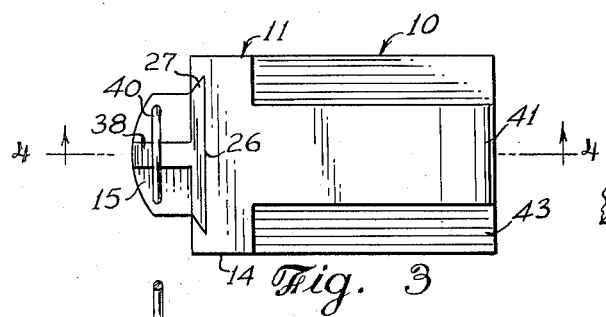
Fig. 3
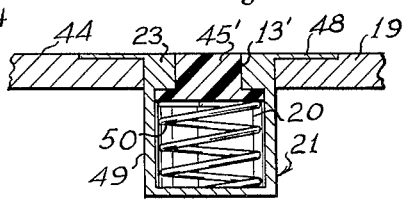
Fig. 6
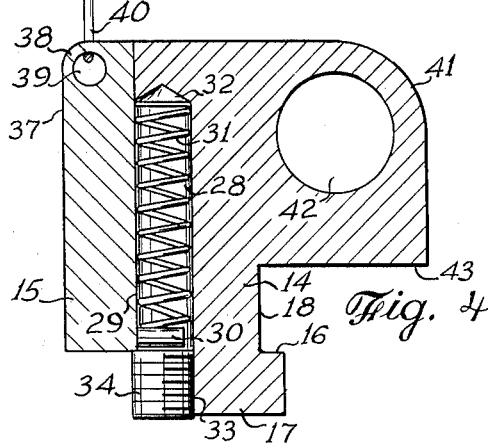
Fig. 4
Fig. 5
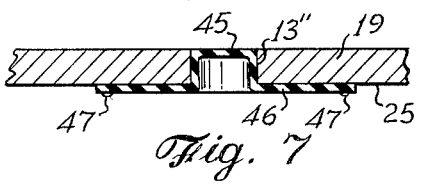
Fig. 7
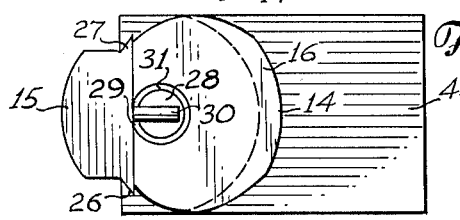
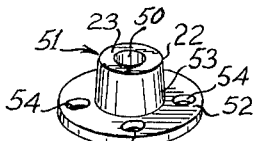
Fig. 8
INVENTOR.
Max Welton Watts
BY
Newton, Hopkins & Jones
ATTORNEYS

United States Patent Office 3,252,681
Patented May 24, 1966

3,252,681
FASTENING DEVICE
Max Welton Watts, Clayton, Ga., assignor to The Aid Corporation, Clayton, Ga., a corporation of Georgia
Filed Apr. 26, 1963, Ser. No. 275,989
7 Claims. (Cl. 248—361)

This invention relates to fastening devices, and more particularly to a fastening device which may be attached to a rope, cable, hawser or any other similar article, and which will permit a point on the article to be quickly and conveniently fastened to or released from a point of attachment.

This invention is a fastening device which is easily inserted into a hole where it will remain firmly fixed until it is released. While it is positioned within the hole, the fastening device provides a convenient point of attachment for the ends of ropes, cables, hawsers or any other article which it is desired to fixedly position with reference to the location of the hole. The article to be fixedly positioned with reference to the hole can be attached to the fastening device either before or after the fastening device is inserted into the hole.

When the article is attached to the fastening device before it is inserted into the hole, the ease with which the fastening device is inserted into and removed from the hole makes the fastening device particularly useful for quickly and firmly fastening or positioning an article, such as the end of a rope or cable used to secure cargo for air, sea or land transportation.

The hole with which the fastening device is used may be simply a hole in a wall or a cargo-carrying floor, platform or deck, and when the fastening device is not in use there will be no cleats, brackets or other similar fittings protruding from the wall or floor to obstruct cargo movement or be a hazard.

These and other features and advantages of the invention will be more clearly understood from the following detailed description and the accompanying drawings, in which like characters designate corresponding parts in all figures, and in which:

FIG. 1 is a side elevation view of the fastening device positioned within a hole in a floor, deck or platform shown in section.

FIG. 2 is a side elevation view of the fastening device as it is being inserted into a hole in a floor, deck or platform.

FIG. 3 is a top plan view of the fastening device.

FIG. 4 is a section view of the fastening device taken in line 4—4 of FIG. 3.

FIG. 5 is a bottom plan view of the fastening device with the plug removed from the channel.

FIG. 6 is a section view of a closeable hole fitting mounted in a hole in a floor, deck or platform for use with the fastening device.

FIG. 7 is a section view of a closure plug mounted beneath a floor, deck or platform to close a hole with which the fastening device can be used.

FIG. 8 is a perspective view of a circular cleat for positioning on a floor, deck or platform to provide a hole suitable for use with the fastening device.

These figures and the following detailed description disclose a preferred specific embodiment of the invention, but the invention is not limited to the details disclosed since it may be embodied in other equivalent forms.

The invention is most easily understood as a fastening device 10 comprised of a fastener pin or anchor element 11 with a lower end 12 which has one outside diameter when the fastener pin 11 is being inserted into or removed from a hole 13, and another larger outside diameter while the fastener pin 11 is fixedly positioned in the hole 13. The fastener pin or anchor element 11 is more or less circular in cross section and is split into a large anchor section 14 and a small wedge section 15 along a plane parallel to, but off-set from, its centerline. In the more or less circular cross section of the fastener pin 11, the line of division or split between the anchor section 14 and wedge section 15 resembles the chord of a circle dividing the small cross sectional area of the wedge section 15 from the substantially larger cross sectional area of the anchor section 14.

A nub or protrusion 16 extends from the lower end 17 of that side 18 of the anchor section 14 most remote from the wedge section 15 and in a direction generally perpendicular to the line of division between the anchor section 14 and wedge section 15 and the centerline of the fastening pin 11. The largest diameter of a cross section through the nub or protrusion 16, anchor section 14 and wedge section 15 perpendicular to the centerline of the fastener pin 11 is greater than the diameter of the hole 13 with which the fastening device 10 is to be used. The largest diameter of a cross section through the nub or protrusion 16 and the anchor section 14 perpendicular to the centerline of the fastener pin 11 excluding the wedge 15 is less than the diameter of the hole 13 with which the fastening device 10 is to be used.

The largest diameter of a cross section through the anchor section 14 and wedge section 15 perpendicular to the centerline of the fastener pin 11 above the protrusion 16 is substantially the same as the diameter of the hole 13 with which the fastening device 10 is to be used. These cross sectional sizes are selected to permit the anchor section 14 with the nub 16 to be inserted into the hole 13 and to permit the anchor section 14 and wedge section 15 to just fit within the hole 13. Beneath the hole 13 is an area having a diameter greater than the diameter of the hole 13 or the largest diameter of the cross section through the nub 16, anchor section 14 and wedge section 15. This area beneath the hole 13 may be simply an open area beneath the floor, deck or platform 19, or behind the wall in which the hole 13 is made, or it may be the interior cavity 20 of a hole fitting 21 embedded in the platform 19, or of a circular cleat 22 attached to a platform 19.

The length of the hole 13 is the thickness of the platform 19 in which the hole is made or of the cap plate 23 of the hole fitting 21 or circular cleat 22 having a hole 13. The length of the fastener pin 11 is sufficiently great that when it inserted into the hole 13 with its lower end 12 and the nub 16 below the platform 19, its upper end 24 extends above the platform 19.

These dimensions of the hole 13, the area beneath the hole 13, and the anchor section 14, wedge section 15 and nub 16 make the inserting and removing of the fastener pin 11 a function of whether the wedge section 15 is or is not included within the cross section of that portion of the fastener pin 11 within the hole 13 at a particular moment. When the wedge section 15 is excluded, the anchor section 14 and nub 16 at its lower end 17, will pass freely through the hole 13 and the fastening device 10 can be easily inserted into and removed from the hole 13. When the wedge section 15 is added to the length of the fastener pin 11 within the hole 13, and with the nub 16 below the platform 19, the fastener pin 11 is centered within the hole 13 and the nub 16 extends out under the underside 25 of platform 19. The fastener pin 11 can not be removed from the hole 13 because the largest diameter of the cross section through the anchor section 14, wedge section 15 and nub 16 is greater than the diameter of the hole 13, and the nub 16 will engage the underside of the platform 19 if the fastener pin 11 is raised upward with both the anchor section 14 and wedge section 15 in the hole 13.

The wedge section 15 is excluded or included within a portion of the length of the fastener pin 11 by making it slidably removable with respect to the anchor section 14. This is most easily accomplished by joining the anchor section 14 and wedge section 15 by a dovetail. The slot 26 of the dovetail is in and extends the length of that flat surface of the anchor section 14 in the plane of division between the anchor section 14 and wedge section 15 and the tongue 27 of the dovetail extends from the corresponding surface of the wedge section 15.

The dovetail permits the wedge section 15 to be slidably moved toward and away from the lower end 17 of the anchor section 14. When the wedge section 15 is slid upward, the lower end 17 of the anchor section 14 with the nub 16 can be passed through the hole 13 and the nub 16 positioned below or removed from below the platform 19. When the wedge section 15 is slid downward so as to be in hole 13 with the anchor section 14 and with the nub 16 below the platform 19, the nub 16 will prevent the fastener pin 11 from being removed from the hole 13.

The anchor section 14 has a cylindrical channel 28 extending into it from its lower end 17. This channel 28 extends parallel to the slot 26 of the dovetail and a portion of the anchor section 14 between the slot 26 and channel 28 is removed to provide an access slit 29 joining the slot 26 and channel 28. A peg 30 extends from the tongue 27 of the dovetail through the slit 29 and into the channel 28. The peg 30 moves within the channel 28 as the wedge section 15 slides upward and downward with respect to the lower end 17 of the anchor section 14.

A spring 31 is placed within the channel 28 between the upper end 32 of the channel 28 and the peg 30. The action of the spring 31 on the peg 30 will urge the wedge section 15 downward toward the lower end 17 of the anchor section 14. This downward movement of the peg 30 and wedge section 15 is checked by threading the lower end 33 of the channel 28 and inserting a threaded plug 34 which the peg 30 strikes as it moves down.

The positions of the peg 30 and plug 34 and length of the channel 28 are selected to allow the wedge section 15 to be slid upward a sufficient distance against spring 31 pressure for the nub 16 to be placed through the hole 13 and beneath the platform 19 without the wedge section 15 being in the hole 13, and to allow the wedge section 15 to move downward with spring 31 pressure to such an extent that wedge section 15 and anchor section 14 are both in the entire length of the hole 13 when the nub 16 is just below the platform 19. If the downward motion of the wedge section 15 is checked by the plug 34 before its lower end 35 extends beneath the platform 19, the distance which the wedge section 15 must be slid upward to be completely out of the hole 13 when the nub 16 is beneath the platform 19 is reduced.

It is readily apparent that the fastener pin 11 may be quickly and easily inserted into and removed from a hole 13 by simply raising the wedge section 15 upward against spring 31 pressure and firmly positioned in the hole 13 by simply releasing the wedge section 15 so that the spring 31 places the wedge section 15 in the hole 13 with the anchor section 14. Thus, the end of a cable or other article attached to the upper end 36 of the anchor section 14 can be quickly and conveniently fastened to or released from the platform 19 or other structure having a hole 13.

The raising of the wedge section 15 is facilitated if the upper end 37 of the wedge section 15 is formed into an ear 38 having a hole 39 into which a ring 40 is inserted. The ring 40 can be conveniently gripped by the hand to raise the wedge section 15. The attaching of a cable or similar article to the anchor section 14 is facilitated if the upper end 36 of the anchor section 14 is formed to resemble an anchor bracket 41 having an eye 42 in which a ring bolt for attaching the article or the article itself can be inserted. The pad 43 of the anchor bracket 41 will engage the upper surface 44 of the platform 19 and insure that the fastener pin 11 passes into a hole 13 only to the extent necessary for the lower end 17 of the anchor section 14 and nub 16 to be beneath the platform 19. The engagement of the upper surface 44 of platform 19 by the pad 43 also prevents rocking motion or tilting by the anchor section 14 and wedge section 15 in the hole 13.

The fastening device 10 may be used simply with a hole 13 in a platform 19 or other similar structure. Since only the hole 13 is necessary, there are no brackets, cleats, pads or other similar apparatus on the platform 19 to obstruct cargo movement or present a hazard to personnel when the fastening device 10 is not in use. The hole 13" (see FIG. 7) may be closed when the fastening device 10 is not in use by inserting a closure plug 45 into it. The closure plug 45 extends upward from a mounting plate 46 through which screws 47 are inserted to attach the mounting plate 46 on the underside 25 of the platform 19.

When the intended use of the fastening device 10 requires its frequent insertion into and removal, the hole which must be closed when the fastening device 10 is not in use, a closeable hole fitting 21 is embedded or recessed in the platform 19 (see FIG. 6). The hole fitting 21 has a platform plate 48 which rests or is fixedly attached to the upper surface 44 of the platform 19. The platform plate 48 has a hole 13' beneath which is a cylindrical chamber 49 in the cavity 20 of which is closure plug 45' and a spring 50. The spring 50 permits the closure plug 45' to be pushed downward into the cavity 20 when the fastening device 10 is inserted into the hole 13', but will maintain the closure plug 45' in the hole 13' when the fastening device 10 is not in use.

When a hole 13 in the platform 19 or other structure is not feasible, the fastening device 10 may be used with a circular cleat 22. The circular cleat 22 is a cylindrical shell 51 having a hole 50 in its cap plate 23 and having a flange 52 extending from its lower end 53. The flange 52 has bolt holes 54 through which bolts or screws are inserted to position the circular cleat 22 on the upper surface 44 of the platform 19 or other structure.

What is claimed as invention is:

1. A fastening device, insertable into and firmly positionable within the area defined by a hole through a plate, said fastening device comprising in combination; an anchor element having an upper end including a segment adapted to only partially fill the hole, a lower end having a protrusion at one side thereof, below said segment, and extending transversely thereof, a slidable wedge element, on the opposite side of said anchor element from said protrusion, extending transversely of said segment, insertable into the hole with the segment of the anchor element and adapted with said segment to fill the hole; means for precluding slidable movement of said wedge into the transverse plane of said protrusion, whereby said lower end of the anchor element is at all times adapted for insertion into said hole; and means for detachably securing an article to the anchor element.

2. A fastening device, insertable into and firmly positionable within the area defined by a hole through a plate, said fastening device comprising in combination; an anchor element having an upper end including a segment adapted to only partially fill the hole, a lower end having a protrusion at one side thereof, below said segment, and extending transversely thereof; a slidable wedge element, on the opposite side of said anchor element from said protrusion, extending transversely of said segment, insertable into the hole with the segment of the anchor element and adapted with said segment to fill the hole; spring means normally urging said slidable wedge toward the transverse plane of said protrusion, whereby said lower end of the anchor element is at all times adapted for insertion into said hole; means for precluding slidable movement of said wedge into the transverse plane of said protrusion;

and means for detachably securing an article to the anchor element.

3. A fastening device, insertable into and firmly positionable within the area defined by a hole through a plate, said fastening device comprising in combination; an anchor element having an upper end including a segment adapted to only partially fill the hole, a lower end having a protrusion at one side thereof, below said segment, and extending transversely thereof, adapted to substantially fill said hole; a slidable wedge element, slidably mounted in said anchor element and extending from the opposite side of said anchor element from said protrusion, insertable into the hole with the segment of the anchor element and adapted with said segment to fill the hole; means for precluding slidable movement of said wedge into the transverse plane of said protrusion, whereby said lower end of the anchor element is at all times adapted for insertion into said hole and means for detachably securing an article to the anchor element.

4. A fastening device, insertable into and firmly positionable within the area defined by a hole through a plate, said fastening device comprising in combination; an anchor element having an upper end including a segment adapted to only partially fill the hole, a lower end having a protrusion at one side thereof, below said segment, and extending transversely thereof; said anchor element having a bore, a slidable wedge element slidably mounted in said bore and extending from the opposite side of said anchor element from said protrusion insertable into the hole with the segment of the anchor element and adapted with said segment to fill the hole; spring means within said bore to urge said wedge toward the transverse plane of said protrusion, means for precluding slidable movement of said wedge into the transverse plane of said protrusion, whereby said lower end of the anchor element is at all times adapted for insertion in said hole; and means for detachably securing an article to the anchor element.

5. A fastening device, insertable into and firmly positionable within the area defined by a hole through a plate, said fastening device comprising in combination; a plate; a hole in said plate defining the area; an anchor element having an upper end including a segment adapted to only partially fill the hole, a lower end having a protrusion at one side thereof below said segment, and extending transversely thereof, said anchor element having a bore; a slideable wedge element slideably mounted in said bore and extending from the opposite side of said anchor element from said protrusion, transversely of said segment above said protrusion, for insertion into the hole with the anchor element and adapted with said segment to fill the hole; means for precluding slideable movement of said wedge into the transverse plane of said protrusion, whereby said lower end of the anchor element is at all times adapted for insertion into said hole; and means for detachably securing an article to the anchor element.

6. A fastening device for fastening the end of a cable with reference to a hole through a platform, said fastening device comprising in combination a platform, having a hole, a circular plate engaging the platform concentric with the hole; a cylindrical chamber extending from the circular plate through the hole, said cylindrical chamber having a channel extending through its upper end and the circular plate and a closed lower end; a closure plug positioned in the cylindrical chamber and slidably movable into the channel; a spring positioned in the cylindrical chamber between the closure plug and the lower end of the cylindrical chamber; an anchor element having a lower end passing through the channel; a wedge element slidably insertable into the channel with the anchor element, a protrusion extending from the lower end of the anchor element in a direction parallel to the circular plate when the fastening device is inserted into the channel; and means for attaching the end of the cable to the upper end of the anchor element.

7. A fastening device for fastening the end of a cable with reference to a location on a platform, said fastening device comprising, in combination a platform, a hollow cylindrical shell extending above the location on the platform, said shell having an upper end with a hole through it into the interior of the shell and a flange at its lower end fixedly attached to the platform; an anchor element having a lower end for passing through the hole; a wedge element on said anchor element slidably insertable into the hole with the anchor element; a protrusion extending from the lower end of the anchor element in a direction parallel to the platform when the fastening device is inserted into the hole; and means for attaching the end of the cable to the upper end of the anchor element.

References Cited by the Examiner

UNITED STATES PATENTS

| | | | |
|---|---|---|---|
| 1,449,147 | 3/1923 | Evans | 248—119 |
| 2,408,547 | 10/1946 | Bertschinger | 248—361 X |
| 2,664,611 | 1/1954 | Shomber | 24—211 |
| 2,836,444 | 5/1958 | Arnold | 287—20.5 |
| 3,065,011 | 11/1962 | De Pew | 297—119 |
| 3,070,042 | 12/1962 | Dunlap | 248—361 X |

CLAUDE A. LE ROY, *Primary Examiner.*

J. PETO, *Assistant Examiner.*